INVENTORS E. E. DAVID, JR.
M. R. SCHROEDER
M. M. SONDHI
BY Jules P. Kirsch
ATTORNEY United States Patent Office 3,405,237

Patented Oct. 8, 1968

3,405,237
APPARATUS FOR DETERMINING THE PERIODICITY AND APERIODICITY OF A COMPLEX WAVE

Edward E. David, Jr., Berkeley Heights, Manfred R. Schroeder, Gillette, and Man M. Sondhi, Princeton, N.J., assignors to Bell Telephone Laboratories, Incorporated, New York, N.Y., a corporation of New York Filed June 1, 1965, Ser. No. 460,101
1 Claim. (Cl. 179—1)

ABSTRACT OF THE DISCLOSURE

In a pitch detector, formants are suppressed thereby eliminating any spurious peaks in the auto-correlation function. Speech is sub-divided into frequency bands, the amplitude of each band is adjusted, either by AGC or infinite clipping, in a manner that flattens the spectral content of the wave, and unwanted components are filtered.

This invention relates to the transmission of human speech in coded form, and in particular to systems for transmitting human speech in coded form in order to conserve transmission channel bandwidth.

Conventional speech communication systems, for example, commercial telephone systems, typically convey human speech by transmitting an electrical facsimile of the acoustic waveform produced by a human talker. Because of the redundancy of human speech, however, facsimile transmission is a relatively inefficient way to transmit speech information, and it is well known that the information contained in a typical speech sound may be transmitted over a channel of substantially narrower bandwidth than that required for facsimile transmission of the speech waveform.

A number of arrangements for compressing or reducing the amount of bandwidth employed in the transmission of speech information have been proposed, and several of these arrangements have been described in an article by E. E. David, Jr., entitled "Signal Theory in Speech Transmission" vol. CT3, IRE Transactions on Circuit Theory, page 232 (1956). In these arrangements, a speech wave is analyzed to determine its significant characteristics, and coded information regarding these characteristics is transmitted instead of the speech wave itself to a distant receiver station where a synthetic speech wave is reproduced from the coded information. Since the coded information requires a relatively small amount of transmission bandwidth, these bandwidth compression arrangements effect a substantial reduction in the amount of bandwidth required to transmit the information content of a speech wave.

In general, a different set of speech wave characteristics is represented in coded form in each of these bandwidth compression systems, but there is one speech characteristic that is typically included in most sets of coded speech characteristics. This characteristic is the so-called pitch characteristic, and it describes the nature of the excitation that is applied to the talker's vocal tract to produce different speech sounds. Thus, the pitch characteristic is descriptive of the fact that the voiced sounds of human speech are produced by exciting the resonances of the vocal tract with quasi-periodic puffs of air released from the lungs into the vocal tract by the glottis or vocal cords, whereas the unvoiced sounds of human speech are produced by the passage of turbulent air through constrictions in the vocal tract.

A number of proposals have been made for automatically measuring and encoding the pitch characteristic, one such proposal being described in G. Raisbeck Patent 2,908,761, issued Oct. 13, 1959. In the Raisbeck pitch analyzing system, a speech wave is correlated with itself to form the speech autocorrelation function, following which the pitch characteristic of a speech wave is derived from the speech autocorrelation function. Since the speech autocorrelation function has the same periodicity and aperiodicity as the speech wave from which it is derived, a voiced portion of a speech wave has periodic speech autocorrelation function and an unvoiced portion of a speech wave has an aperiodic autocorrelation function. In particular, periodicity in a speech wave is manifested in the corresponding speech autocorrelation function by a repetitive maximum value occurring at multiples of the fundamental period of the speech wave, while aperiodicity in a speech wave is manifested in the corresponding speech autocorrelation function by a nonrepetitive maximum value. These characteristics of the speech autocorrelation function are exploited in the Raisbeck arrangement by detecting the maximum values of the speech autocorrelation function to determine whether they are repetitive or nonrepetitive, and if repetitive, to determine the period of repetition.

In a number of situations such as transitions between speech sounds, there is a rapid change in the pitch characteristic and this is accompanied in the speech autocorrelation function by either the reduction of maximum values reflecting periodicity and aperiodicity or the presence of several large peaks or oscillations in addition to maximum values. In such situations a pitch analyzer which determines the speech pitch characteristic by detecting maximum values of the speech autocorrelation function will tend to detect spurious peaks instead of locating maximum values reflecting the true periodicity or aperiodicity of the autocorrelation function and thereby produce an erroneous indication of the pitch characteristic. Since the naturalness of synthetic speech reconstructed from coded speech information is highly dependent upon the accuracy of the pitch information, erroneous indications of the pitch characteristic adversely affect the quality of synthetic speech.

An investigation of the source of the difficulties in accurately determining the pitch characteristic by locating maximum values in the speech autocorrelation function has revealed that one of the principal factors is the influence of the characteristics of the vocal tract upon the autocorrelation function waveform. Specifically, it has been determined that the resonances or formants of the vocal tract produce substantial oscillations in the autocorrelation function waveform, and that it is these formant-induced oscillations that interfere with accurate detection of maximum values reflecting the true periodicity and aperiodicity of the autocorrelation function.

In the arrangement provided by the present invention accurate determination of the pitch characteristic is enhanced by suppressing formant-induced oscillations in the autocorrelation function waveform. Suppression of formant-induced oscillations in the speech autocorrelation function waveform is accomplished in this invention by so-called spectrum flattening. Spectrum flattening is defined in this invention to mean suppression of formant peaks in the envelope of a speech spectrum so that the flattened speech spectrum is characterized by a relatively flat envelope in the sense that the slope of the envelope is substantially constant. Thus spectrum flattening may be performed by dividing the spectrum of a speech wave into its individual frequency components, followed by adjusting the amplitude of each component to a predetermined level. The predetermined levels are selected so that the spectrum defined by combining the amplitude-adjusted components has a relatively constant slope envelope.

Following spectrum flattening, the waveform corresponding to the flattened spectrum obtained by combining the amplitude-adjusted components of the speech wave is correlated with itself in an autocorrelation pitch analyzer to produce the autocorrelation function of the spectrum flattened wave. As a result of the spectrum flattening performed in this invention, the amplitudes of spurious peaks in the autocorrelation function of the spectrum flattened wave are substantially reduced so that the pitch characteristic of the original wave may be determined with a high degree of accuracy from the locations of the maximum autocorrelation values. The accuracy with which the pitch characteristic is determined by application of the principles of this invention is evidenced by the natural sounding quality of synthetic speech reproduced from this pitch characteristic.

The invention will be fully understood from the following detailed description of illustrative embodiments thereof taken in connection with the appended drawings in which.

Figure 3A:
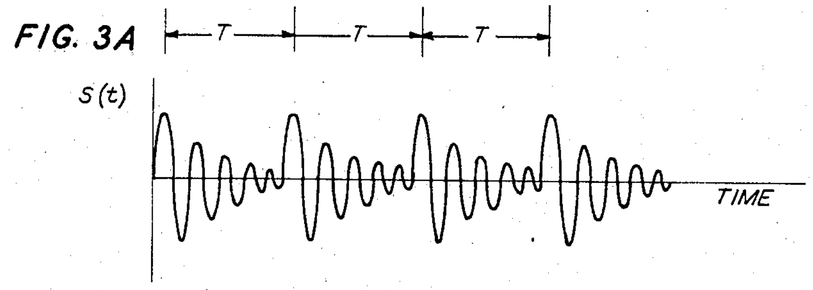
FIGS. 3A, 3B, 3C and 3D are simplified waveform diagrams which are of assistance in explaining the principles of this invention.
Figure 4A:
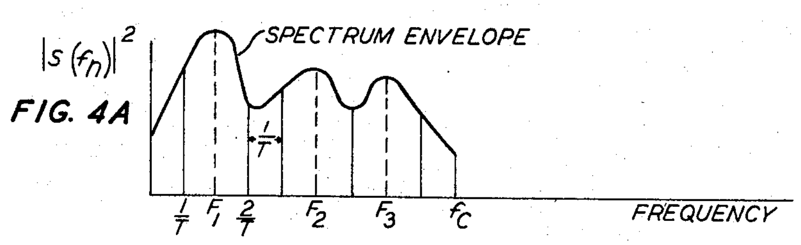
FIGS. 4A and 4B are idealized spectrum diagrams which are of assistance in explaining the principles of this invention.

Referring first to FIGS. 3A and 4A, FIG. 3A illustrates in simplified form a portion of the waveform of a voiced periodic speech sound $s(t)$ with period T, and FIG. 4A illustrates the power spectrum $|S(f_n)|^2$ of such a sound, where $$f_n=\frac{n}{T}$$

$n=0, 1, 2 \ldots$. The peaks in the spectrum envelope in FIG. 4A, denoted $F_1$, $F_2$, and $F_3$, represent the principal formants or resonances of the human vocal tract, while the uniformly spaced vertical lines at multiples of the fundamental speech frequency $1/T$ represent the frequency components of the speech spectrum.

Figure 3B:
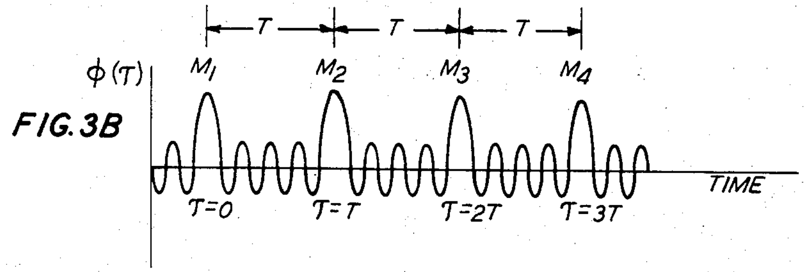

FIG. 3B illustrates in idealized form the autocorrelation function, $\varphi(\tau)$, obtained by correlating $s(t)$ with itself, in which it is evident that $\varphi(\tau)$ is characterized by repetitive maximum values $M_1$, $M_2$, $M_3$, $M_4$ having the same period T as the original speech wave. It has been observed, however, that the autocorrelation function often has a waveform of the character shown in FIG. 3C, in which it is noted that the repetitive maximum values $M_1$, $M_2$, $M_3$ and $M_4$ are easily confused with other peaks of large magnitude denoted $m_1$, $m_2$, $m_3$. It is therefore apparent that an arrangement utilizing maximum autocorrelation values as an indication of periodicity and aperiodicity can produce an erroneous indication through the mistaken identification of spurious peaks as maximum values.

Figure 3C:
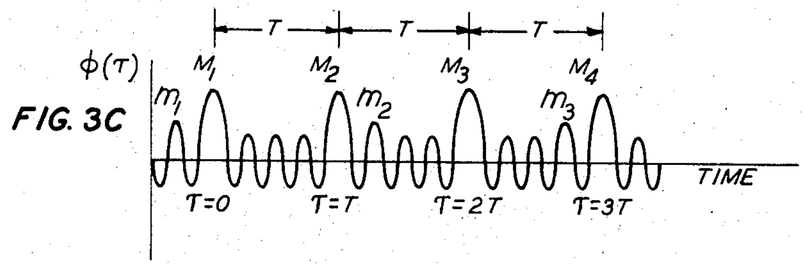
Figure 3D:
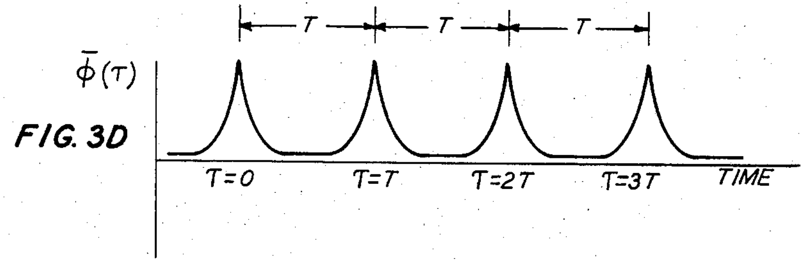
Figure 4B:
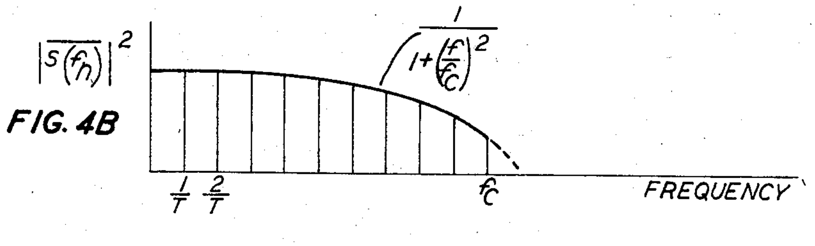

In the present invention the accurate detection of maximum autocorrelation values is enhanced by suppressing formants in the spectrum envelope which give rise to unwanted large oscillations of the type illustrated by $m_1$, $m_2$, and $m_3$ in FIG. 3C. FIG. 4B illustrates the result of flattening the spectrum shown in FIG. 4A in accordance with the principles of this invention. It is observed in a comparison of FIG. 4A and FIG. 4B that the formant peaks in the envelope $|S(f)|^2$ of the original speech spectrum $|S(f_n)|^2$ have been eliminated to produce a so-called flattened spectrum $|\overline{S(f_n)}|^2$ characterized by a relatively flat or constant spectrum envelope. By way of example, the spectrum $|\overline{S(f_n)}|^2$ can be made to have an envelope $|\overline{S(f)}|^2$ specified by the relation, $$|\overline{S(f)}|^2=\frac{1}{1+\left(\frac{f}{f_c}\right)^2} \qquad (1)$$

where $f$ denotes frequency and $f_c$ denotes the frequency at which the envelope is 3 db down. The Fourier transform or autocorrelation function corresponding to the envelope defined in Equation 1 is $$\overline{\varphi}(\tau)=\pi e^{-\frac{|\tau|}{\tau_0}},\ \tau_0=\frac{1}{\pi f_c} \qquad (2)$$

see, for example, vol. 1, Tables of Integral Transforms (Erdelyi ed. 1954) page 118. Repeated periods of the autocorrelation function specified by Equation 2 are illustrated in FIG. 3D, in which it is observed that the autocorrelation function of a wave having an envelope given by Equation 1 is characterized by well defined periodic maximum values and in which intermediate peaks have been suppressed.

Figure 1:
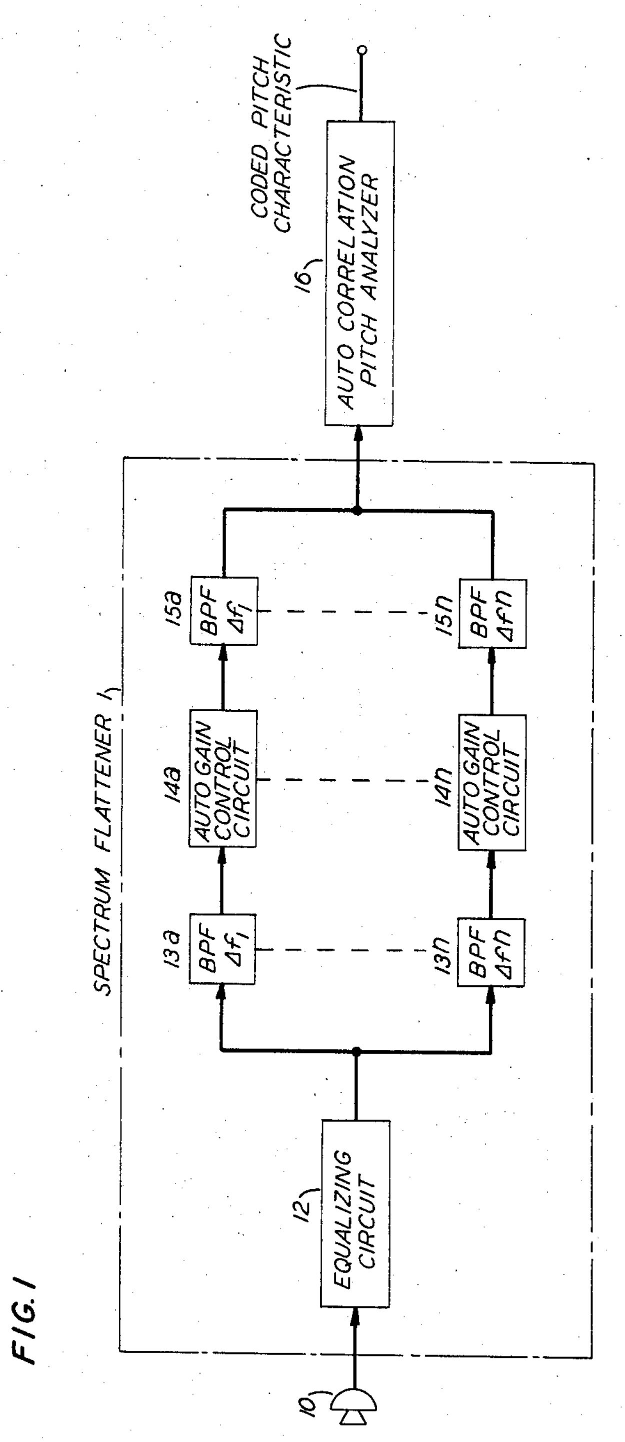
FIG. 1 is a schematic block diagram showing an arrangement for determining the pitch characteristic of a speech waveform in accordance with the principles of this invention.
Figure 2:
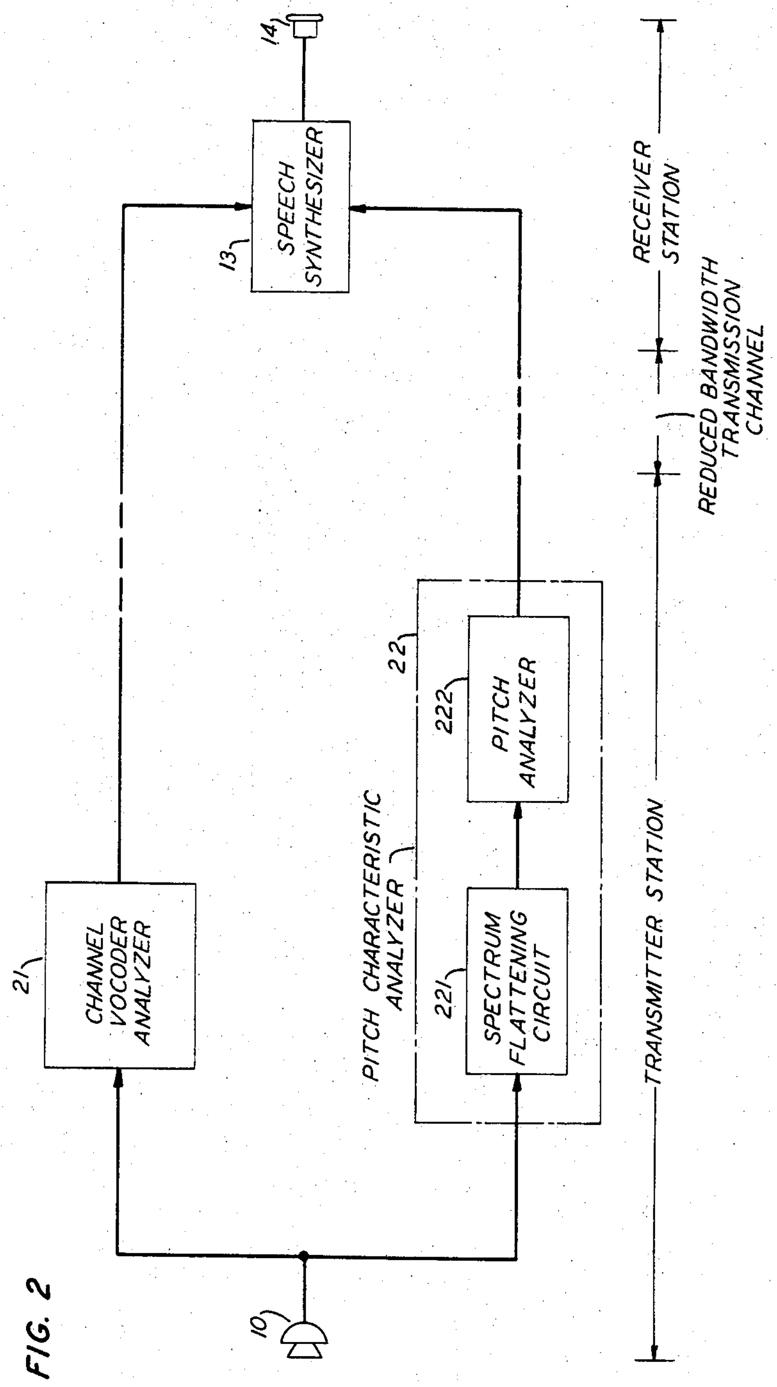
FIG. 2 is a schematic block diagram showing a complete bandwidth compression system incorporating the pitch characteristic analyzer of this invention.

Referring now to FIG. 2, the apparatus of this invention is shown incorporated in a bandwidth compression communication system. This invention may be utilized in any one of a number of bandwith compression systems, a specific example being a channel vocoder system of the type described in H. W. Dudley Patent 2,151,091, granted Mar. 21, 1939. At the transmitter station, an incoming speech wave from transducer 10, which may be a conventional microphone, is applied in parallel to channel vocoder analyzer 21 and pitch characteristic analyzer 22. Analyzer 21 derives from the incoming speech wave a number of so-called channel control signals representing in coded form the amplitudes of selected harmonic components of the incoming speech wave, while analyzer 22 derives a coded information bearing signal representing the pitch characteristic of the incoming speech wave. Analyzer 22 comprises a spectrum flattening circuit 221 followed by a pitch analyzer 222. Circuit 221 is illustrated in detail in FIG. 1, and analyzer 222 may be of any well-known construction, although it is preferred that it be designed in accordance with the principles disclosed in the above-mentioned Raisbeck patent. Circuit 21 derives a spectrum flattened version of the incoming speech wave, that is, a speech wave having a spectrum envelope of relatively constant slope, and analyzer 222 derives from the autocorrelation function of the spectrum flattened output signal of circuit 221 a coded pitch control signal representative of the pitch characteristic of the incoming speech wave. The pitch control signal and the channel control signals from analyzer 21 are transmitted over a reduced bandwidth transmission channel to a receiver station where they are utilized in a conventional speech synthesizer 13 to form a synthetic speech wave which is a natural sounding replica of the incoming speech wave. Reproducer 14, for example, a conventional loudspeaker, converts the synthetic speech wave into audible speech sounds.

Turning next to FIG. 1, this drawing illustrates a preferred embodiment of the spectrum flattening arrangement of this invention. An incoming speech wave from transducer 10 is applied to spectrum flattener 1, within which the speech signal is first applied to an equalizing network 12, for example, a differentiator, in order to increase by a selected amount the amplitudes of the high frequency components of the speech wave. The spectrum of the equalized speech wave from circuit 12 is divided into continguous frequency sub-bands $\Delta f_1$ through $\Delta f_n$ by a bank of bandpass filters 13*a* through 13*n*, by providing filters 13*a* through 13*n* with respective contiguous pass bands $\Delta f_1$ through $\Delta f_n$. The sub-bands are made sufficiently narrow so that individual speech frequency components will be defined as accurately as possible. Each frequency component is passed to an automatic gain control circuit 14*a* through 14*n* to adjust the amplitude of each frequency component to a predetermined value. If desired, automatic gain control circuits 14*a* through 14*n* may be constructed in accordance with the principles of automatic gain control circuit design disclosed in B. F. Logan et al. Patent 3,139,487, issued June 30, 1964. For example, each automatic gain control circuit may adjust the amplitude of the respective incoming frequency component so that the amplitude adjusted output signals of circuits 14*a* through 14*n* have the relative amplitudes shown in FIG. 4B. Alternatively, infinite clipping circuits may be employed instead of automatic gain control circuits, if desired. Each of the amplitude adjusted output signals of automatic gain control circuits 14*a* through 14*n* is passed through a respective bandpass filter 15*a* through 15*n*, where each filter 15*a* through 15*n* is provided with a pass band corresponding to that of the preceding filter 13*a* through 13*n* in order to eliminate unwanted distortion components. It is to be noted that filters 15*a* through 15*n* may be eliminated when automatic gain control circuits are employed to adjust the amplitudes of the frequency sub-bands, whereas filters 15*a* through 15*n* are necessary when infinite clipping circuits are employed to adjust the amplitudes of the frequency sub-bands.

The output signals of filters 15*a* through 15*n* are combined to form a signal having a spectrum with a flattened envelope, that is, a signal having an envelope of relatively constant slope; for example, the envelope may be of the type shown in FIG. 4B. The spectrum flattened signal from flattener 1 is then delivered to autocorrelation pitch analyzer 16, in which the pitch characteristic of the original speech wave is determined from the autocorrelation function $\overline{\varphi(\tau)}$ of the spectrum flattened signal.

Although this invention has been described in terms of detecting the pitch characteristic of a speech wave, it is to be understood that applications of the principles of this invention are not limited to the field of speech communication, but include other fields in which it is desired to determine the periodicity and aperiodicity of a complex wave. Further, it is to be understood that the spectrum flattening principles of this invention may be employed to enhance the accuracy of pitch analyzers other than those that determine the pitch characteristic from the autocorrelation function of an incoming wave. In addition, it is to be understood that the above-described embodiments are merely illustrative of the numerous arrangements that may be devised for the principles of this invention by those skilled in the art without departing from the spirit and scope of the invention.

What is claimed is:

1. In combination with apparatus for determining the periodicity and aperiodicity of the complex wave characterized by an amplitude spectrum with an envelope having a plurality of formant peaks, an arrangement for suppressing said peaks in said spectrum envelope, which comprises, a plurality of filters for dividing the spectrum of said complex wave into a corresponding plurality of frequency sub-bands, a plurality of controllable amplitude-adjusting means in one-to-one correspondence with said plurality of filters for individually adjusting the amplitudes of those portions of said complex wave in each of said frequency sub-bands to individually predetermined levels, and means for combining said individually adjusted signals in each of said frequency sub-bands to develop a complex signal having a relatively flat spectrum envelope characterized by a substantially constant slope.

References Cited

UNITED STATES PATENTS

| | | | |
|---|---|---|---|
| 2,699,464 | 1/1955 | Di Toro | 172—1 |
| 2,908,761 | 10/1959 | Raisbeck | 179—1 |
| 2,927,969 | 3/1960 | Miller | 179—1 |
| 3,091,665 | 5/1963 | Schroeder | 179—1 |

KATHLEEN H. CLAFFY, *Primary Examiner.*

R. P. TAYLOR, *Assistant Examiner.*